United States Patent [19]

Onuma et al.

[11] Patent Number: 4,508,841

[45] Date of Patent: Apr. 2, 1985

[54] PROCESS FOR PRODUCING POROUS REFRACTORY INORGANIC OXIDE PRODUCTS

[75] Inventors: Kazuhiko Onuma, Machida; Yoichi Kageyama, Isehara; Hiromu Kobayashi, Yokohama; Akihiro Matsuki, Yokohama; Makoto Suzuki, Yokohama, all of Japan

[73] Assignees: Mitsubishi Chemical Industries, Ltd.; Asia Oil Company, Limited, both of Tokyo, Japan

[21] Appl. No.: 340,763

[22] Filed: Jan. 19, 1982

[30] Foreign Application Priority Data

| Jan. 19, 1981 | [JP] | Japan | 56-6147 |
| Jan. 19, 1981 | [JP] | Japan | 56-17759 |
| Mar. 2, 1981 | [JP] | Japan | 56-29699 |
| Apr. 8, 1981 | [JP] | Japan | 56-52730 |
| Dec. 9, 1981 | [JP] | Japan | 56-198014 |

[51] Int. Cl.³ .......................... B01J 29/00; C01F 7/02
[52] U.S. Cl. ....................... 502/73; 423/628; 423/630; 423/592; 423/335; 423/608; 502/439; 502/263; 502/355
[58] Field of Search ............... 423/335, 592, 608, 625, 423/630, 628; 502/73, 263, 439

[56] References Cited

U.S. PATENT DOCUMENTS

| 2,691,598 | 10/1954 | Meurice et al. | 252/449 |
| 3,190,723 | 6/1965 | Jacobson | 423/608 |
| 3,223,482 | 12/1965 | Puddington et al. | 423/335 |
| 3,406,228 | 10/1968 | Hardy et al. | 423/625 |
| 3,663,182 | 5/1972 | Hamling | 423/608 |
| 3,676,330 | 7/1972 | Plank et al. | 252/455 Z |
| 3,726,811 | 4/1973 | Toombs et al. | 423/630 |
| 4,010,242 | 3/1977 | Iller et al. | 423/335 |
| 4,315,839 | 2/1982 | Bouge et al. | 502/439 |

FOREIGN PATENT DOCUMENTS

| 311761 | 7/1930 | United Kingdom . |
| 627523 | 8/1949 | United Kingdom . |
| 954567 | 4/1964 | United Kingdom . |
| 1131425 | 10/1968 | United Kingdom ............... 423/592 |

*Primary Examiner*—Herbert T. Carter
*Attorney, Agent, or Firm*—Oblon, Fisher, Spivak, McClelland & Maier

[57] ABSTRACT

A porous refractory inorganic oxide product is produced by shaping a mixture of carbon black and a refractory inorganic oxide and/or a precursor of refractory inorganic oxide; drying a product; firing it in an oxygen-containing gas flow while burning said carbon black.

13 Claims, 11 Drawing Figures

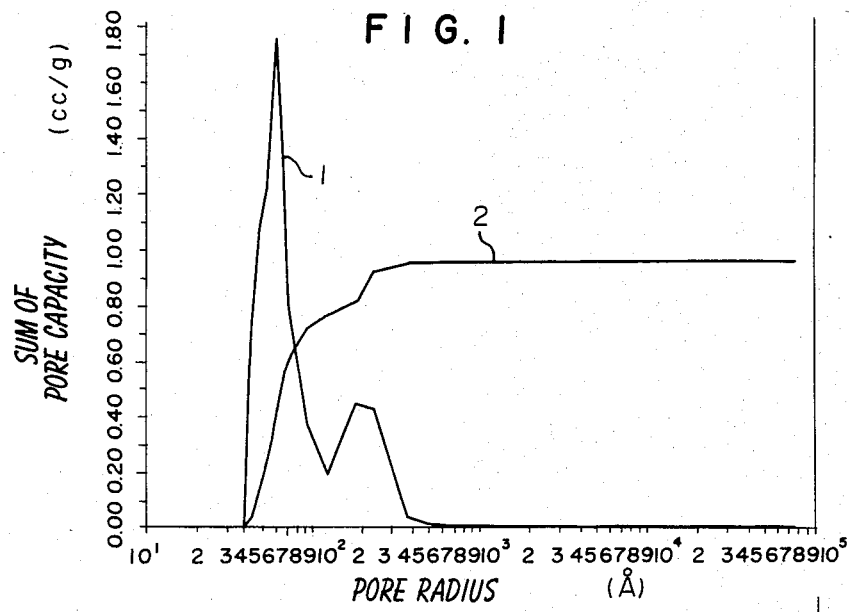
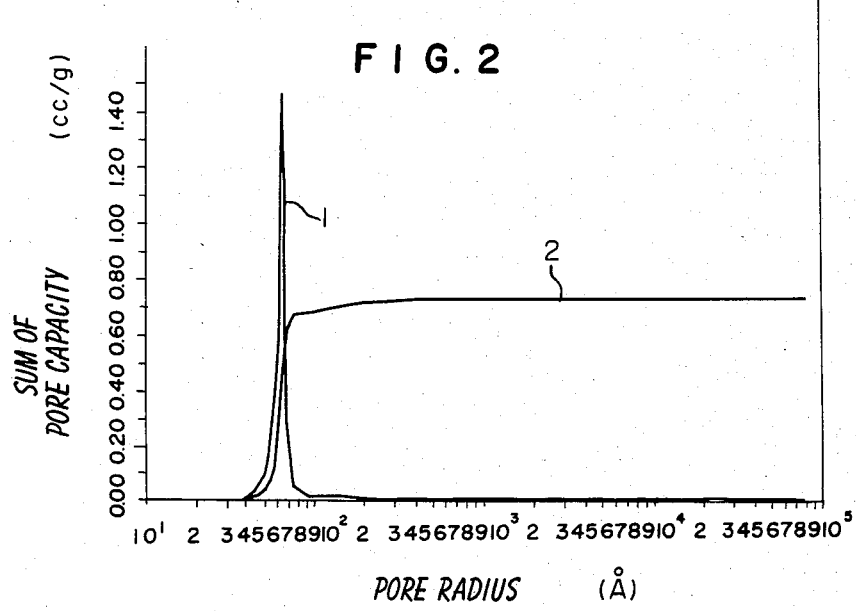

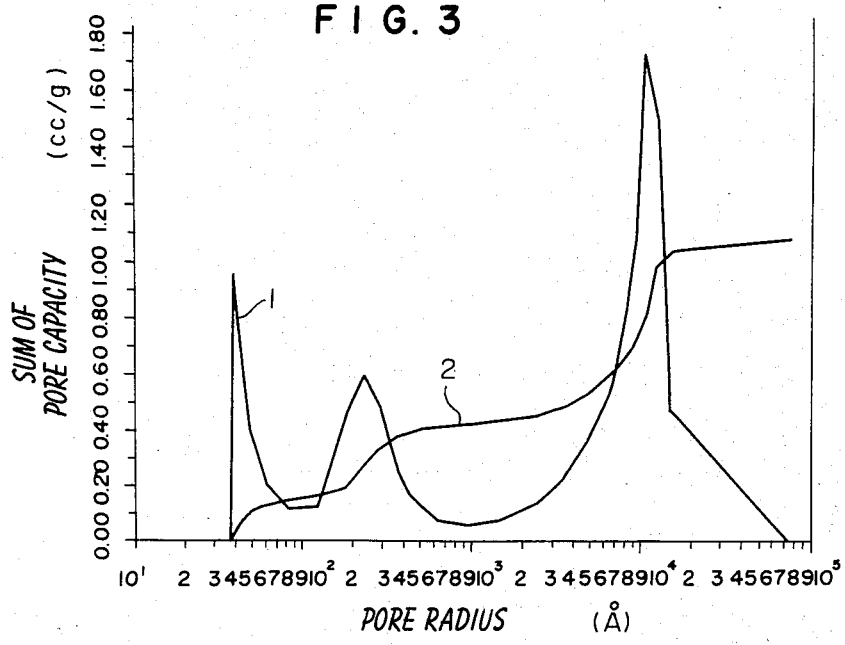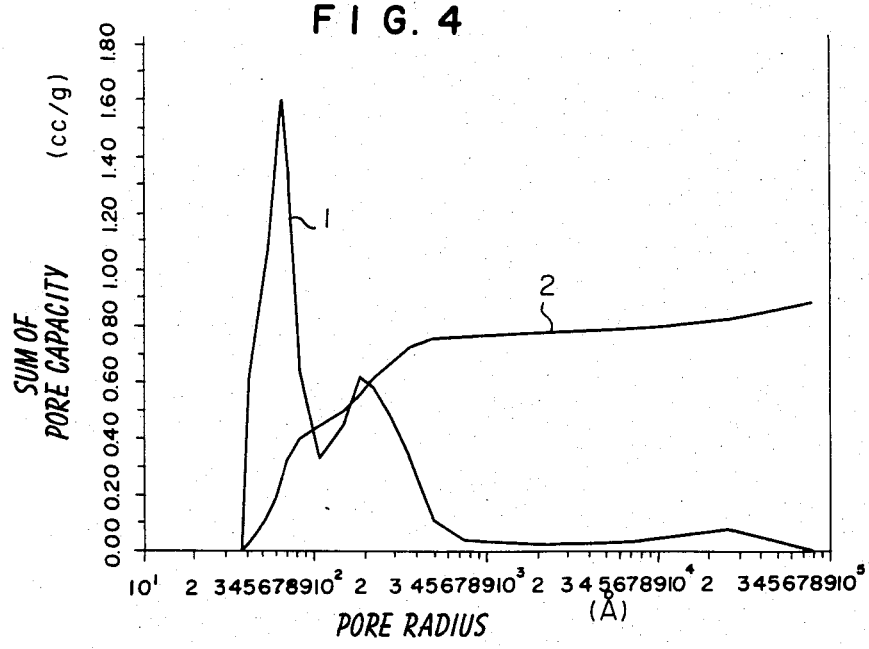

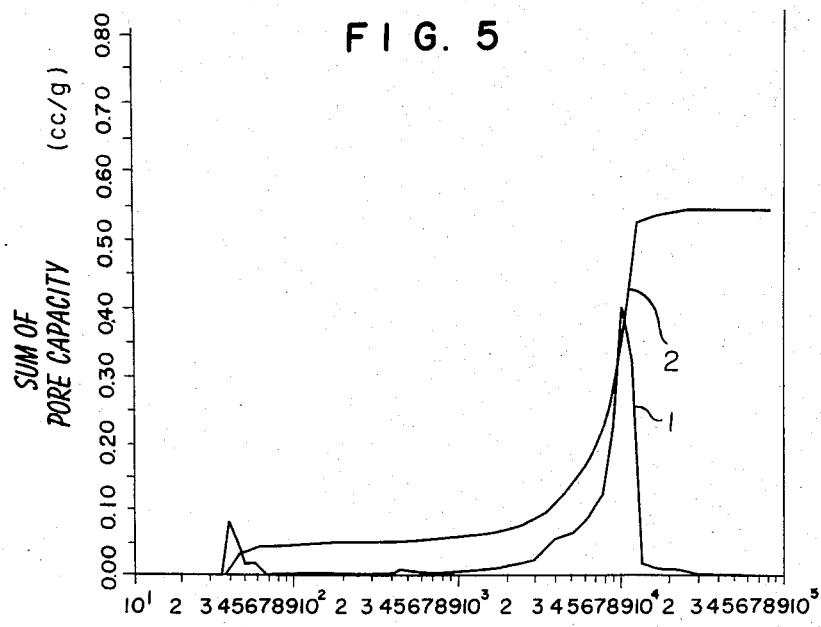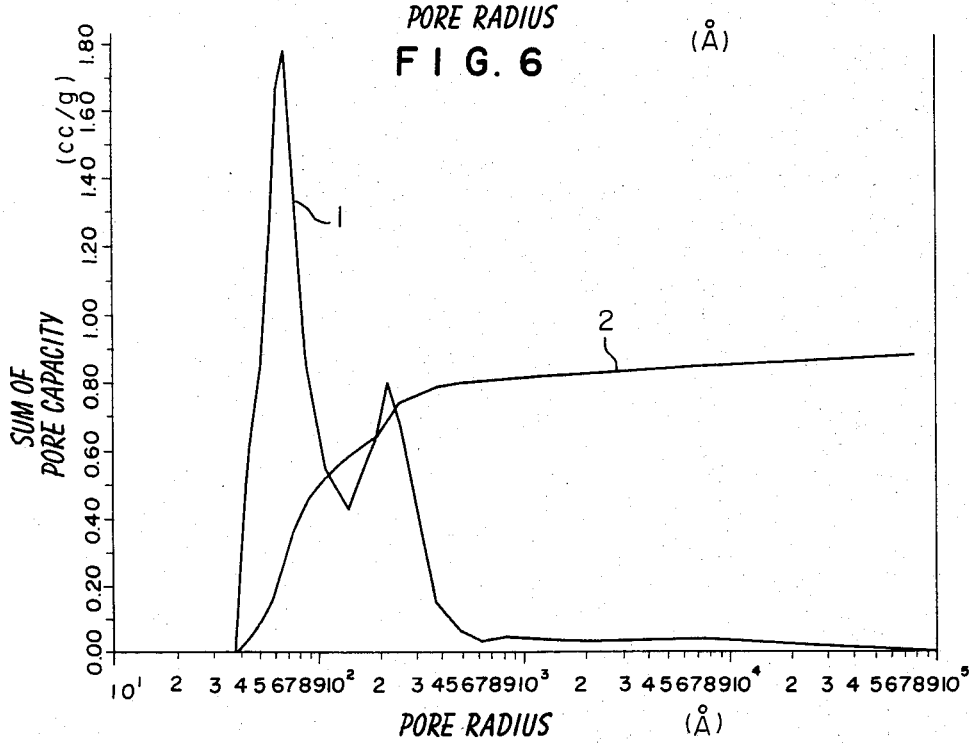

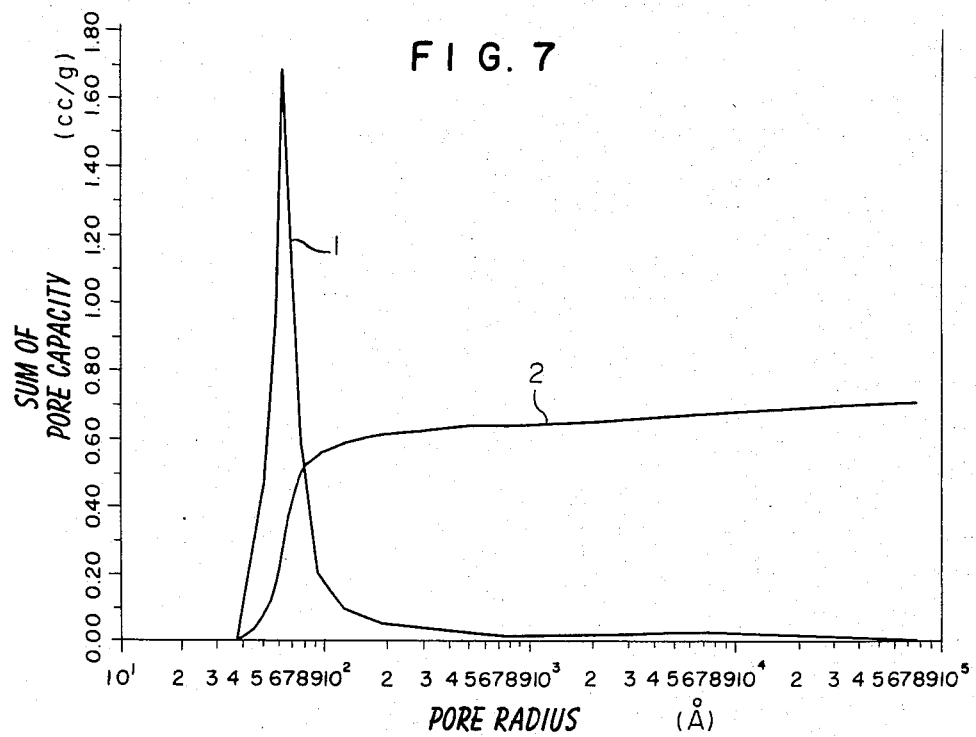
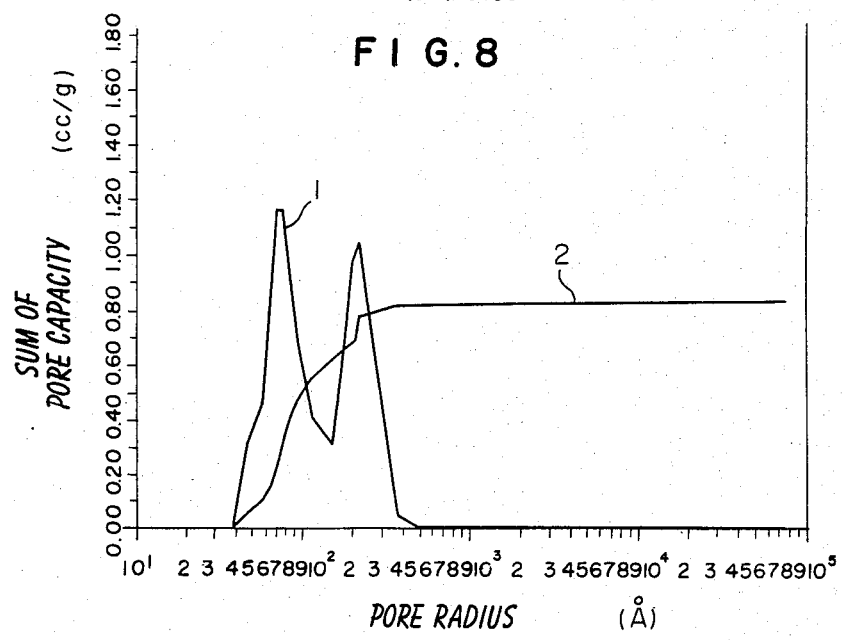

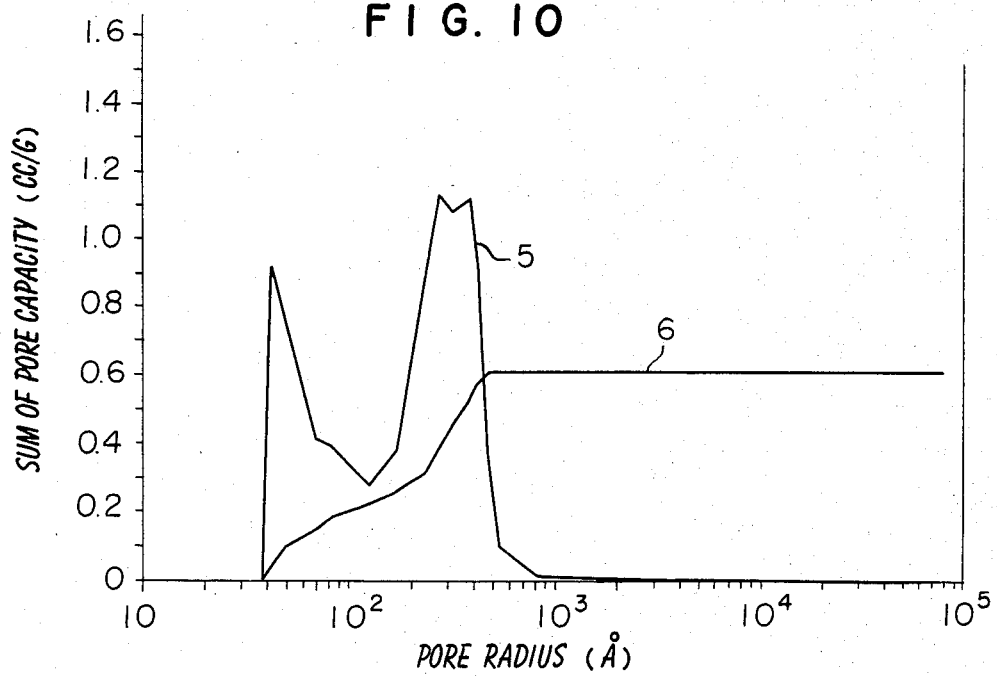
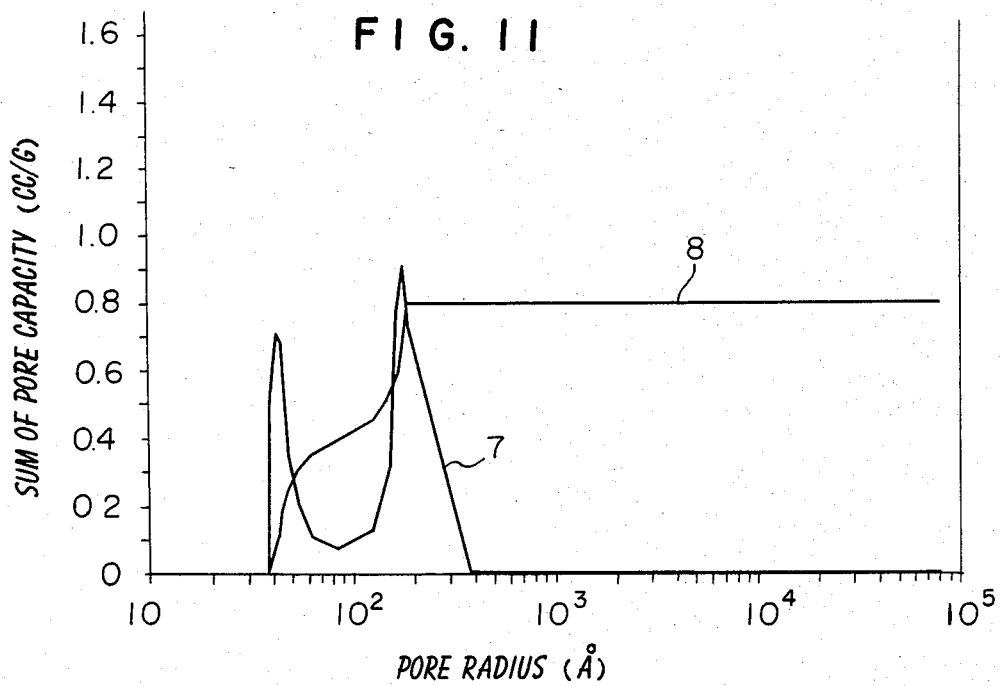

PROCESS FOR PRODUCING POROUS REFRACTORY INORGANIC OXIDE PRODUCTS

BACKGROUND OF THE INVENTION

1. Field of the Invention

The present invention relates to a porous refractory inorganic oxide product and a process for producing the same. More particularly, it relates to a porous refractory inorganic oxide product having excellent mechanical strength and large specific surface area and relatively middle pores (referred to as mesopores) which is suitable for a support of catalyst and a catalyst and a process for producing the same.

2. Description of the Prior Art

The inorganic oxides such as alumina, silica, titania, zirconia, thoria, boria, crystalline aluminosilicate and crystalline and amorphous natural minerals have various usages such as an adsorbent, a catalyst and a support of catalyst. One of the most important characteristics required for an adsorbent, a catalyst and a support of catalyst is a range and capacity of a pore distribution. Excellent result is given for the purpose of the refractory inorganic oxide depending upon the characteristic.

In the measurement of a pore distribution of a porous refractory inorganic oxide product, various pore distributions can be provided depending upon an inorganic oxide, a source thereof, and a condition for preparation such as a preparation of a product and a firing temperature. Thus, the pores are mainly affected depending upon primary and secondary grains in the particles of the inorganic oxide for the product. Thus, the pore distribution may be controlled in certain degree by a control of the process, though the pore distribution of the resulting product is mainly depending upon the kind of the inorganic oxide for the product.

Various processes and operations for controlling pore distribution such as a selection of a source, a use of a suitable additive and an improvement of a shaping process have been proposed, because the control of pores is quite important for imparting remarkably superior characteristic for a specific purpose in the use of the product as a support of catalyst and a catalyst. Thus, the control of pores must be attained without losing physical properties such as a mechanical strength and a wearing durability.

The pore sizes of the porous refractory inorganic oxide product are classified into three groups of fine pores having a radius of less than 100 Å (micropores) middle pores having a radius of 100 Å–1000 Å (mesopores) and large pores having a radius of more than 1000 Å (macropores). Certain reactions in which the presence of mesopores is important, have been known. For example, the diffusion in pores is accelerated to advantageously perform reactions in the presence of the mesopores. On the other hand, it has been difficult to provide intentionally as desired such mesopores at high capacity by the conventional technology. Alumina has various usages as catalysts and supports of catalyst. It has been desired to obtain a product having a high content of mesopores in concentration, together with micropores but it has been difficult. In accordance with the present invention, the requirement has been attained. Thus, it is remarkably advantageous in chemical industries, to produce a porous refractory inorganic oxide product having mesopores having said characteristics at high ratio regardless of a kind of the inorganic oxide used with a relatively economical source, an additive and an easy mechanical process.

From the aforementioned viewpoint, the inventors have studied to obtain a porous refractory inorganic oxide product having the excellent aforementioned characteristics without losing physical characteristics such as a mechanical strength and a wearing resistance.

SUMMARY OF THE INVENTION

It is an object of the present invention to provide a porous refractory inorganic oxide product having a controlled pore distribution and to provide a process for producing the same always as expectedly.

The foregoing and other objects of the present invention have been attained by providing a porous refractory inorganic oxide product which has a pore distribution having a clear peak between 100 Å and 1000 Å in diameter and a pore capacity (porosity) of 0.1 cc/g. or more between 100 Å and 500 Å in radius which is obtained by shaping a mixture of carbon black and a refractory inorganic oxide and/or a precursor of refractory inorganic oxide; drying a product; firing it in an oxygen-containing gas flow while burning said carbon black.

The refractory inorganic oxide is preferably an active alumina product which has a specific surface area ranging from 30 to 350 m$^2$/g; a total pore capacity of pores between 37.5 Å and 75000 Å in radius ranging from 0.6 to 1.5 cc/g.; a pore capacity of pores between 37.5 Å and 500 Å in radius of 90% or more based on the total pore capacity; each peak pore distribution being between 40 Å and 100 Å in radius and between 100 Å and 500 Å in radius; a pore capacity of pores between 37.5 Å and 100 Å in radius of 0.45 cc/g. or more; and a pore capacity of pores between 100 Å and 500 Å in radius of 0.1 cc/g. or more.

BRIEF DESCRIPTION OF THE DRAWINGS

FIGS. 1 to 11 respectively show graphs of each pore distributions in the porous refractory inorganic oxide products obtained in Example 1, Reference 1, Example 8, Example 9, Reference 2, Example 12, Reference 5, Example 15, Reference 8, Example 21 and Example 23 wherein each curve 1 shows each condition of the pore distribution and each curve 2 shows each integration of pore capacity.

DETAILED DESCRIPTION OF THE PREFERRED EMBODIMENTS

Figure 9:
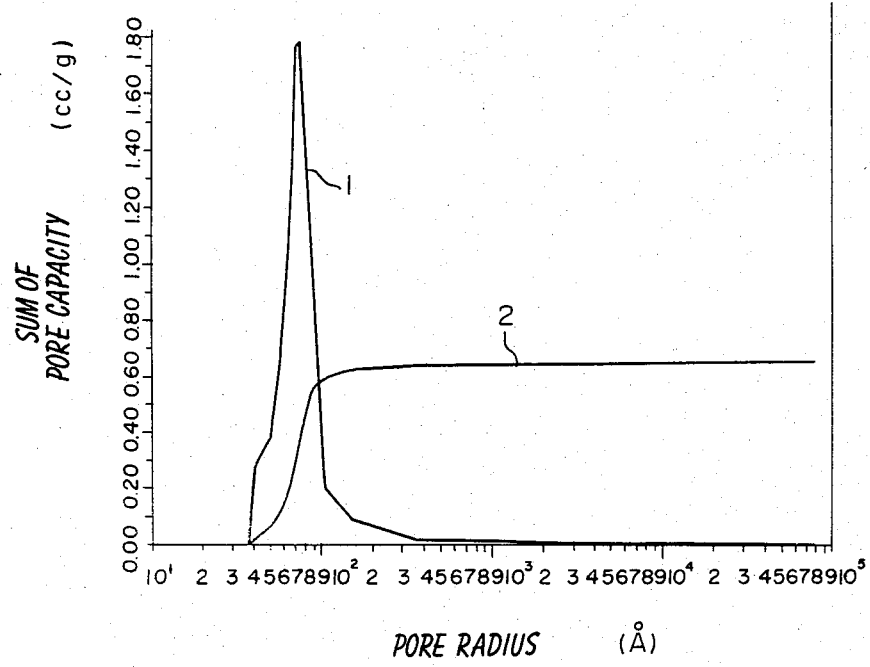

The typical refractory inorganic oxides used in the present invention include inorganic oxides such as alumina, silica, titania, zirconia, thoria, boria, beryllia, magnesia, iron oxide and zinc oxide; and two or more mixed inorganic oxides such as silica-alumina, silica-titania, alumina-boria, silica-magnesia and alumina-zirconia; synthetic crystalline alumino-silicate zeolites such as Y-form, X-form, mordenite, erionite and ZSM-5; and other zeolites; natural zeolite containing a crystalline compound of mordenite, chabazite, clinoptilolite, ferrierite; and natural clays such as natural zeolite, bentonite, kaoline, montmorillonite and sepiolite and thermally or chemically modified materials thereof.

The alumina and precursor can be active alumina such as γ-alumina, η-alumina; active alumina precursors as alumina or alumina hydrates which can be converted into active alumina by firing such as boehmite, pseudo-boehmite, gibbsite, and rehydratable transition alumina such as χ-alumina and ρ-alumina.

In the shaping operation, a precursor of refractory inorganic oxide can be used. The typical precursors thereof include hydrated oxides, hydroxides, chlorides, alkoxides, nitrates, sulfates, organic acid salts of metals corresponding to the oxides as alumina, silica, titania and zirconia such as Al, Si, Ti, Zr, Th, B, Be, Mg, Fe and Zn and chelate compounds and complexes of the metal and the metallic powders. It can be one or more kinds. The synthetic crystalline inorganic oxide of the element or the other element can be plural precursors for forming the crystalline compound by a hydrothermal reaction for examples, sodium aluminate, silica gel, aluminum sulfate, alkali metal hydroxide, alkylammonium cation etc. for forming crystalline aluminosilicate.

The carbon black as an additive for forming the controlled mesopores used in the present invention will be illustrated.

In the present invention, carbon black having a average diameter ranging from 150 to 3000 Å is used. Carbon black usually has secondary chain structure formed by cohesion of grains (referring to as structure). The position and length of the distribution of the mesopores of the product obtained by the process of the present invention are highly affected by the particle diameter and the structure size of carbon black.

The degree of the structure size can be shown by an oil absorption of carbon black such as DBP absorption; a volume of dibutyl phthalate absorbed in 100 g. of carbon black (unit ml/100 g.). The normal carbon black has the DBP absorption ranging from about 60 to 300 ml/100 g. and the special carbon black may have the DBP absorption of more than 300 ml/100 g.

In the process of the present invention, when the DBP absorption of carbon black is the same, an average pore radius of mesopores of the resulting product can be smaller depending upon the decrease of particle size of carbon black, whereas it can be larger depending upon the increase of grain size of carbon black. The product having relatively broader distribution of pores can be obtained by using carbon black having broader distribution of particle size. The particle size of carbon black is selected in view of the DBP absorption and the mesopore distribution of the product.

Various kinds of carbon black can be used. The typical carbon blacks include channel black (carbon black produced by the channel process) such as Mitsubishi Carbon Black #100, #600 manufactured by Mitsubishi Chemical Industry Co., Ltd., furnace black (carbon black produced by a furnace process) such as Diablack A, Diablack H manufactured by Mitsubishi Chemical Industry Co., Ltd., and Asahithermal FT manufactured by Asahi Carbon; Denkaacetylene manufactured by Denki Kagaku Kogyo and ketjen black EC manufactured by Akzo Chem. The pore distribution having a clear peak between 100 Å and 1000 Å in radius can be given for the molded product by selecting carbon black as desired.

The carbon and the refractory inorganic oxide and/or the precursor thereof (referring to as a source) are used in the shaping process. The shapes of the products can be microsphere and granular forms such as spherical, cylindrical and tabllet forms and also can be platy or honeycomb form.

A size of the granule is usually in a range of about 1 to 10 mm. When the product is used as a catalyst or a support of catalyst in a fluidized bed or a filler for chromatography it is necessary to be more than about 30–50μ.

The well-known shaping process can be a spraying process for microsphere; a tabletting process in dry or wet system, an extrusion process, an extrusion-granulating process, a tumbling granulating process, bricketting process, a disintegration granulating process and an bead forming in oil process for granules. These shaping processes are not always employed for all of the sources and the desired shaping process is selected depending upon the source. The shaping process is not limited to only one process for one kind of the source and various shaping processes can be selected for one kind of the source as well-known by a person skilled in the art. It is not easy to illustrate all of the applications for the shaping processes. Thus, the shaping process will be further illustrated by certain examples.

The fact that the process of the present invention in the incorporation of carbon black can be applied in the cases of various sources and processes will be understood.

In the shaping process, the source and carbon black must be uniformly mixed as far as possible in order to provide superior physical characteristics. In the case of using a solid powder as the source it is preferable to disintegrate it into a fine powder though it is not critical. The size of the powder often means sizes of secondary and thirdly aggregated particles and a redispersion caused by deaggregation or a reformation of primary particles caused by peptization is resulted by mixing or kneading in the following step. Thus, it is possible to uniformly impregnate carbon black in spaces between the primary particles.

The resulting product of the present invention preferably has pore distribution having a clear peak between 100 Å and 1000 Å in radius and a pore capacity of 0.1 cc/g. or more between 100 Å and 500 Å in radius. Such capacity of mesopores is mainly depending upon the content of carbon black. The content of carbon black is usually in a range of 5 to 120 wt.% preferably 10 to 100 wt.% especially 20 to 80 wt.% based on the source.

When the other additives which will be burnt by the firing are used, the content of the additives is usually up to about 10 wt.% in order to prevent the deterioration of the physical characteristics such as the strength of the resulting product. On the contrary, the content of carbon black in the present invention is remarkably larger. It is surprising result that the controlled position and capacity of mesopores are given without deteriorating the required physical characteristics by the incorporation of large content of carbon black. The importance of the present invention will be understood.

In the preparation of the porous refractory inorganic oxide product is possible to use suitable additives such as water, acids and polyvinyl alcohol, by conventional methods.

As described, various sources and various processes can be considered.

The present invention will be further illustrated by embodiments using alumina.

In the first embodiment, pseudoboehmite (X ray diffraction shows alumina monohydrate having the broad boehmite structure) is used as the source.

A mixture of 100 wt.parts of pseudoboehemite and 30 wt.parts of carbon black is uniformly mixed by a mixer and moved into a kneader and water and an additive are added and the mixture is kneaded. Suitable additives include inorganic acids, organic acids, and alkaline nitrogen compounds such as ammonia, hydrazine, aliphatic amines, aromatic amines and heterocyclic amines; and the other orgaic compounds such as polyvinyl alcohol and polyethyleneglycol. The resulting kneaded mixture is extruded through die holes having a suitable size by an extruder in a suitable form. If necessary, the extruded product can be aged in a closed container.

In the other embodiment, rehydratable transition alumina is used as the source and a mixture is treated by a tumbling granulating process, which is described in Japanese Unexamined Patent Publication No. 158397/1979. A mixture of the transition alumina and carbon black, if necessary, an additive such as crystalline cellulose is uniformly mixed and charged in a tumbling granulating machine and granulated during spraying water in a spherical form having a desired size. The resulting product is rehydrated in two steps at room temperature and at 50°-150° C. to form the stiff granular product.

On the other hand, the products formed by various other processes such as a spraying process are respectively dried and fired to form porous refractory inorganic oxide products which have characteristics suitable for a support of catalyst or a catalyst.

In the firing step of the present invention, the other function for burning out carbon black must be attained.

The oxidative burning for removing carbon black must be carefully performed because carbon black is combustible and the content of carbon black is relatively large. When heat of combustion is not satisfactorily eliminated, the temperature is not maintained to the predetermined temperature to rise higher. Even though the temperature is lower than the upper limit, sudden rising of the temperature is unfavorable.

The final firing temperature in the step including the burning-out of carbon black is about 500° C. or higher. The upper limit is not critical as far as the resulting porous refractory inorganic oxide product does not loss the activity for the support or catalyst. For example, in the case of alumina, it is about 800° C. or lower in $\gamma$- or $\eta$-form as the final form and it is 1200° C. or lower in $\theta$-form as the final form. The time for firing is not critical and is usually in a range of 1 hour to 1 day. Thus, it provides the porous refractory inorganic oxide product having excellent physical characteristics such as a mechanical strength, a wearing resistance, a large surface area and a large pore capacity (porosity) and having mesopores formed by addition and elimination of carbon black and controlled distribution and capacity of pores. That is, the porous product which has the pore distribution having a clear peak between 100 Å and 1000 Å in radius and a pore capacity of 0.1 cc/g. or more between 100 Å and 500 Å in radius is obtained.

It has been difficult to give the characteristics of a specific surface area ranging from 30 to 350 m²/g; a total pore capacity of pores between 37.5 Å and 75000 Å in radius ranging from 0.6 to 1.5 cc/g.; a pore capacity of pores between 37.5 Å and 500 Å in radius of 90% or more based on the total pore capacity; each peak pore distribution being between 40 Å and 100 Å in radius and between 100 Å and 500 Å in radius; a pore capacity of pores between 37.5 Å and 100 Å in radius of 0.45 cc/g. or more; and a pore capacity of pores between 100 Å and 500 Å in radius of 0.1 cc/g. or more for a porous active alumina product among the porous refractory inorganic oxide products. The characteristics are remarkably effective for various applications.

The capacity of mesopores is mainly depending upon the content of carbon black. The distribution is controlled depending upon the kind of carbon black such as the particle size and the structure. The detail will be illustrated by certain examples. The characteristics suitable for various usages such as a catalyst, a support of catalyst and an adsorbent will be expected in view of the unique characteristics of the resulting product.

The present invention will be further illustrated by certain examples and references which are provided for purposes of illustration only and are not intended to be limiting the present invention.

In the examples, the distribution and capacity of pores were measured by a mercury compression type porosimeter (Porosimeter Series 2000 manufactured by Carlo Erba Co. ). The maximum pressure of 2000 kg/cm² gauge to be the measurable range of 37.5 Å to 75,000 Å in radius.

The surface area was measured by the nitrogen adsorbing process by Sorptmatic 1800 manufactured by Carlo Erba Co. and calculated by the BET process.

The crushing strength was calculated from a crushing load (kg/piece) of specimens in the radius direction measured by Kiya type Hardness tester and shown as an average for 20 specimens.

The physical characteristics of carbon blacks used in the examples are shown in Table 1.

TABLE 1

| Carbon black | | Physical characteristic | |
|---|---|---|---|
| Kind | Particle diameter (Å) | DBP absorbing capacity (ml/100 g.) | Specific surface area (m²/g) |
| A | 700 | 125 | 20 |
| B | 220 | 130 | 110 |
| C | 310 | 130 | 80 |
| D | 400 | 120 | 65 |
| E | 700 | 80 | 20 |
| F | 600 | 124 | 35 |
| G | 630 | 123 | 30 |

Note: DBP absorbing capacity measured by ASTM D2414-79

EXAMPLE 1

A mixture of 225 g. of boehmite powder (Pural SB manufactured by Condea Co. ) (Al₂O₃ content: 75%) and 67.5 g. of carbon black A (30 wt.% based on boehmite) was mixed in a dry form by a mixer for 60 min. and the mixture was moved into a batch type kneader (capacity: 2 liter) and was kneaded during adding 220 g. of 4.3% nitric acid aqueous solution for about 5 min. and further kneaded for 25 min. The mixture was further kneaded for 25 min. after adding 128 g. of 2.1% ammonia water. The mixture was extruded in a diameter of 1.5 mm by a screw type extruding machine. The extruded product was dried at 120° C. for 3 hours and then, was gradually heated in an electric furnace in dry air flow and was fired at 600° C. for 3 hours to obtain an active alumina product which had a diameter of about 1.2 mm and an average crushing strength of 2.5 kg/piece and a surface area of 274 m²/g.

The pore capacity and the pore distribution of the product are as follows:

| | |
|---|---|
| Pore capacity (37.5–100 Å in radius): | 0.728 cc/g. |
| Pore capacity (100–500 Å in radius): | 0.231 cc/g. |
| Total pore capacity (37.5–75000 Å in radius): | 0.965 cc/g. |

| | |
|---|---|
| Peak pore radius in distribution: | 64 Å and 200 Å |

The pore distribution curve of the product is shown in FIG. 1.

REFERENCE 1

In accordance with the process of Example 1 except that carbon black was not used, an active alumina product was produced. The product had a diameter of about 1.2 mm and a crushing strength of 2.6 kg/piece and a surface area of 195 m²/g.

The pore capacity and the pore distribution are as follows:

| | |
|---|---|
| Pore capacity (37.5–100 Å in radius): | 0.680 cc/g. |
| Pore capacity (100–500 Å in radius): | 0.049 cc/g. |
| Total pore capacity (37.5–75000 Å in radius): | 0.729 cc/g. |
| Peak pore radius in distribution: | 62 Å |

The pore distribution curve of the product is shown in FIG. 2.

EXAMPLE 2

The example shows the fact that the pore distribution can be controlled by selecting the kinds of carbon blacks.

In accordance with the process of Example 1 except varying the kind of carbon black as shown in Table 2, each alumina product was produced. The products had a crushing strength of about 2 kg/piece. The pore distributions and the pore capacities of the products are shown in Table 2.

TABLE 2

| Kind of carbon black | B | C | D | E |
|---|---|---|---|---|
| Pore capacity (cc/g.) (37.5–100 Å in radius) | 0.610 | 0.618 | 0.628 | 0.800 |
| Pore capacity (cc/g.) (100–500 Å in radius) | 0.406 | 0.368 | 0.331 | 0.175 |
| Total pore capacity (cc/g.) (37.5–75000 Å in radius) | 1.024 | 0.995 | 0.976 | 0.985 |
| Peak pore radius in distribution (Å) | 54 130 | 60 150 | 55 150 | 57 125 |

EXAMPLE 3

The example shows the effect of the content of carbon black.

In accordance with the process of Example 1 except varying the content of carbon black as shown in Table 1, each alumina product was produced.

Because of a capacity of a kneader, the sum of the contents boehmite and carbon black was adjusted to 300 g. Thus, the amounts of 4.3% nitric acid aqueous solution and 2.1% ammonia water were adjusted to 97.7 g. and 56.9 g. based on 100 g. of boehmite, respectively. The results are shown in Table 3.

TABLE 3

| Content of carbon black based on boehmite (wt. %) | 25 | 50 | 40 | 70 |
|---|---|---|---|---|
| Crushing strength (kg/piece) | 2.0 | 1.2 | 2.1 | 1.8 |
| Pore capacity (cc/g.) (37.5–100 Å in radius) | 0.630 | 0.640 | 0.705 | 0.497 |
| Pore capacity (cc/g.) (100–500 Å in radius) | 0.280 | 0.449 | 0.435 | 0.584 |
| Total pore capacity (cc/g.) (37.5–75000 Å in radius) | 0.910 | 1.100 | 1.153 | 1.091 |
| Peak pore radius in distribution (Å) | 63 190 | 54 305 | 63 280 | 46 310 |

EXAMPLE 4

In accordance with the process of Example 1, a mixture of 225 g. of boehmite and 67.5 g. of carbon black A was mixed and then was kneaded in a kneader for 30 min. after adding 225 g. of 3.75% acetic acid aqueous solution instead of nitric acid and then for 25 min. after adding 112.5 g. of 1.30% ammonia water and then, the mixture was dried and fired to obtain an active alumina product which had a crushing strength of 2.1 kg/piece and a surface area of 283 m²/g.

The pore capacity and the pore distribution of the product are as follows:

| | |
|---|---|
| Pore capacity (37.5–100 Å in radius): | 0.585 cc/g. |
| Pore capacity (100–500 Å in radius): | 0.246 cc/g. |
| Total pore capacity (37.5–75000 Å in radius): | 0.838 cc/g. |
| Peak pore radius in distribution: | 50 Å, 200 Å |

EXAMPLE 5

In accordance with the process of Example 1, a mixture of 225 g. of boehmite and 67.5 g. of carbon black A was mixed and charged into a kneader and a solution of 9 g. of polyvinyl alcohol NM-14 (Nippon Gosei K.K.) (4 wt.% based on boehmite) in 230 g. of water was added and the mixture was kneaded for 85 min. and extruded, dried and fired to obtain an active alumina product which had a crushing strength of 1.4 kg/piece and a surface area of 246 m²/g.

The pore capacity and the pore distribution of the product are as follows:

| | |
|---|---|
| Pore capacity (37.5–100 Å in radius): | 0.188 cc/g. |
| Pore capacity (100–500 Å in radius): | 0.320 cc/g. |
| Total pore capacity (37.5–75000 Å in radius): | 0.585 cc/g. |
| Peak pore radius distribution: | 62 Å 250 Å |

EXAMPLE 6

In accordance with the process of Example 1, except extruding the mixture through die holes having a diameter of 3.5 mm and drying it at 120° C. for 3 hours and heating gradually in an electric furnace under dry air flow and firing it at 600° C. for 3 hours or at 1000° C. for 3 hours, each active alumina product was produced.

The characteristics of the products are shown in Table 4.

TABLE 4

| Temperature in firing (°C.) | 600 | 1,000 |
|---|---|---|
| Form of alumina | γ— | θ— |
| Diameter of molded product (mm) | 2.8 | 2.6 |
| Crushing strength (kg/piece) | 2.7 | 2.0 |
| Surface area (m²/g.) | 248 | 135 |
| Pore capacity (cc/g.) (37.5–100 Å in radius) | 0.802 | 0.520 |

TABLE 4-continued

| Temperature in firing (°C.) | 600 | 1,000 |
|---|---|---|
| Pore capacity (cc/g.) (100–500 Å in radius) | 0.268 | 0.242 |
| Total pore capacity (cc/g.) (37.5–75000 Å in radius) | 1.109 | 0.772 |
| Peak pore radius in distribution (Å) | 58 210 | 80 200 |

EXAMPLE 7

The example shows results of a product obtained from transition alumina as a source.

A mixture of 1 kg of transition alumina having an average particle diameter of about 50μ as $\chi$ and $\rho$-alumina analyzed by X-ray and 300 g. of carbon black A was mixed for 60 min. by a mixer. The mixture was treated for a spherical granulation by a plate type tumbling granulating machine while spraying water to obtain a spherical product having a diameter of 3-4 mm. The wet spherical product was charged in a closed container and aged at room temperature for 4 days and then, the product was charged into an autoclave with water and kept at about 130° C. for 2 hours to perform steam curing (rehydration). The alumina hydrate was dried and fired at 600° C. for 3 hours to obtain an active alumina product which had a crushing strength of 4.3 kg/piece and a surface area of 263 m²/g.

The pore capacity and the pore distribution of the product are as follows:

| | |
|---|---|
| Pore capacity (37.5–100 Å in radius): | 0.183 cc/g. |
| Pore capacity (100–500 Å in radius): | 0.199 cc/g. |
| Total pore capacity (37.5–75000 Å in radius): | 0.768 cc/g. |
| Peak pore radius in distribution: | 40 Å 250 Å |

EXAMPLE 8

Silica

Into a mixer, 300 g. of silica zol (Cataloid S-20L manufactured by Shokubai Kasei K.K.) (60 g. as SiO₂) was charged and 18 g. of carbon black F (30 wt.% based on SiO₂) was added and they were mixed at high speed for 4 min. The resulting slurry was sprayed by minispray under the following condition: inlet temperature: 165° C.; dry air flow rate: 0.45 m³/min.; atomizing pressure: 1.5 kg/cm²; feeding rate: 10 g./min.

The resulting spray-dried product was fired at 650° C. for 3 hours under air flow. The resulting silica beads had a diameter of about 30μ and a surface area of about 154 m²/g.

The pore capacity and the pore distribution of the product are as follows:

| | |
|---|---|
| Pore capacity (37.5–100 Å in radius): | 0.158 cc/g. |
| Pore capacity (100–500 Å in radius): | 0.242 cc/g. |
| Total pore capacity (37.5–75000 Å in radius): | 1.077 cc/g. |
| Peak pore radius in distribution: | 230 Å 10,000 Å |

The pore distribution curve of the product is shown in FIG. 3.

EXAMPLE 9

Silica

A silica sol-carbon black slurry similar to that of Example 8 (1000 g. of silica sol and 60 g. of carbon black F) was prepared and stirred to evaporate water and then, dried at 100° C. for 1 day to obtain a silica-carbon black powder. The powder was ground and moved into a batch type kneader (capacity: 2 liter) and 100 ml of 10% aqueous solution of polyvinyl alcohol (NM-14 manufactured by Nippon Gosei K.K. ) was added and the mixture was kneaded for 110 min. and then, extruded by an extruding machine to give a diameter of 5 mm. The extruded product was dried at 130° C. for 1 day and fired at 600° C. for 6 hours under air flow to obtain a product which had a surface area of 147 m²/g.

The pore capacity and the pore distribution of the product are as follows:

| | |
|---|---|
| Pore capacity (37.5–100 Å in radius): | 0.430 cc/g. |
| Pore capacity (100–500 Å in radius): | 0.323 cc/g. |
| Total pore capacity: | 0.878 cc/g. |
| Peak pore radius in distribution: | 65 Å, 190 Å |

The pore distribution curve of the product is shown in FIG. 4.

REFERENCE 2

Silica

In accordance with the process of Example 8 except that carbon black was not used, the silica sol was spray-dried and fired to obtain a product which had a surface area of 145 m²/g.

The pore capacity and the pore distribution of the product are as follows:

| | |
|---|---|
| Pore capacity (37.5–100 Å in radius): | 0.045 cc/g. |
| Pore capacity (100–500 Å in radius): | 0.015 cc/g. |
| Total pore capacity: | 0.542 cc/g. |
| Peak pore radius in distribution: | 10,000 Å |

The pore distribution curve of the product is shown in FIG. 5.

EXAMPLE 10

Titania

A mixture of 45 g. of carbon black F and about 1000 ml of water was mixed at high speed for 3 min. by a mixer to obtain a slurry. The slurry was stirred under cooling with ice and 500 g. of titanium tetrachloride (special grade manufactured by Kantokagaku K.K.) (210 g. as TiO₂) was added dropwise and then, the mixture was further stirred under cooling with ice 28% ammonia water (special grade manufactured by Kishida Kagaku K.K.) was gradually added to give pH of 8 thereby resulting sudden precipitation. About 800 ml of ammonia water was needed. The content of carbon black in the precipitate was 21 wt.% based on TiO₂. The precipitate was separated by a filtration and washed with water for several times and then, was dried at 130° C. for 1 day to obtain a mess. The mess was ground and seived into 4–7 mesh, and the powder was fired at 600° C. for 5 hours under air flow to obtain a product which had a surface area of 40.2 m²/g.

The pore capacity and the pore distribution of the product are as follows:

| | |
|---|---|
| Pore capacity (37.5–100 Å in radius): | 0.096 cc/g. |
| Pore capacity (100–500 Å in radius): | 0.134 cc/g. |
| Total pore capacity: | 0.344 cc/g. |
| Peak pore radius in distribution: | 96 Å, 930 Å |

REFERENCE 3

Titania

In accordance with the process of Example 10 except that carbon black was not used, a titania product was produced. The titania product had a surface area of 35.3 m²/g.

The pore capacity and the pore distribution of the product are as follows:

| | |
|---|---|
| Pore capacity (37.5–100 Å in radius): | 0.125 cc/g. |
| Pore capacity (100–500 Å in radius): | 0.053 cc/g. |
| Total pore capacity: | 0.220 cc/g. |
| Peak pore radius in distribution: | 86 Å |

EXAMPLE 11

Silica+Alumina

A mixture of 133 g. of boehmite powder (Pural SB manufactured by Condea Co) (Al₂O₃ content: 75%) (100 g. as Al₂O₃) and 100 g. of silica fine powder (AEROSil #300 manufactured by Nippon Aerosil K.K.) and 50 g. of carbon black G (21 wt.% based on boehmite+silica) was mixed in a dry form for 50 min. by a mixer and the mixture was moved into a batch type kneader (capacity: 2 liter) and kneaded while adding 300 g. of 1.3% nitric acid aqueous solution during about 30 min. and further kneaded for 10 min. The mixture was extruded to give a diameter of 1.5 mm by a screw type extruding machine. The extruded product was dried at 130° C. for 1 day and fired at 600° C. for 5 hours under air flow to obtain a product made of 50 wt.% of silica and 50 wt.% of alumina which had a surface area of 280 m²/g.

The pore capacity and the pore distribution of the product are as follows:

| | |
|---|---|
| Pore capacity (37.5–100 Å in radius): | 0.620 cc/g. |
| Pore capacity (100–500 Å in radius): | 0.110 cc/g. |
| Total pore capacity: | 0.746 cc/g. |
| Peak pore radius in distribution: | 52 Å, 110 Å |

EXAMPLE 12

Silica.Alumina+Alumina

A mixture of 250 g. of boehmite (Pural SB manufactured by Condea Co.), 75 g. of silica-alumina powder (N-633H manufactured by Nikki Kagaku K.K.) and 81 g. of carbon black G (25 wt.% based on total of boehmite+silica.alumina) was mixed in a dry form for 60 mm. by a mixer and the mixture was moved into a batch type kneader and was kneaded while adding 257 g. of 2.7% nitric acid aqueous solution during about 5 min. and further kneaded for 45 min. The mixture was admixed with 132 g. of 1.4% ammonia water and the mixture was kneaded for 25 min. and extruded to give a diameter of 1.5 mm by a screw type extruding machine. The molded product was dried at 130° C. for 1 day and fired at 600° C. for 6 hours under air flow to obtain a product made of 28 wt.% of silica.alumina and 72 wt.% of alumina which had a surface area of 295 m²/g.

The pore capacity and the pore distribution of the product are as follows:

| | |
|---|---|
| Pore capacity (37.5–100 Å in radius): | 0.490 cc/g. |
| Pore capacity (100–500 Å in radius): | 0.304 cc/g. |
| Total pore capacity: | 0.873 cc/g. |
| Peak pore radius in distribution: | 69 Å, 220 Å |

The pore distribution curve of the product is shown in FIG. 6.

REFERENCE 4

Silica+Alumina

In accordance with the process of Example 11 except that carbon black was not used, a product made of silica and alumina was produced. The product had a surface area of 267 m²/g.

The pore capacity and the pore distribution of the product are as follows:

| | |
|---|---|
| Pore capacity (37.5–100 Å in radius): | 0.498 cc/g. |
| Pore capacity (100–500 Å in radius): | 0.019 cc/g. |
| Total pore capacity: | 0.521 cc/g. |
| Peak pore radius in distribution: | 44 Å |

REFERENCE 5

Silica.Alumina+Alumina

In accordance with the process of Example 12 except that carbon black was not used, a product made of silica.alumina and alumina was porduced. The porduct had a surface area of 270 m²/g.

The pore capacity and the pore distribution of the product are as follows:

| | |
|---|---|
| Pore capacity (37.5–100 Å in radius): | 0.560 cc/g. |
| Pore capacity (100–500 Å in radius): | 0.072 cc/g. |
| Total pore capacity: | 0.708 cc/g. |
| Peak pore radius distribution: | 63 Å |

The pore distribution curve of the product was shown in FIG. 7.

EXAMPLE 13

Alumina+Boria

A mixture of 250 g. of boehmite (Pural SB manufactured by Condea), 75 g. of boron trioxide (B₂O₃) (Junsei Kagaku K.K.), 81 g. of carbon black G (25 wt.% based on total of boehmite and boria) was mixed in a dry form for 60 min. by a mixer and was moved into a batch type kneader. The mixture was kneaded while adding 207 g. of 3.4% nitric acid aqueous solution during about 5 min. and then, further kneaded for 45 min. The mixture was admixed with 50 g. of 3.7% ammonia water and was kneaded for 25 min. and extruded to give a diameter of 1.5 mm. by a screw type extruding machine. The extruded product was dried at 130° C. for 1 day and fired at 600° C. for 6 hours under air flow to obtain a product made of 28 wt.% of boria and 72 wt.% of alumina which had a surface area of 225 m²/g.

The pore capacity and the pore distribution of the product are as follows:

| | |
|---|---|
| Pore capacity (37.5–100 Å in radius): | 0.208 cc/g. |
| Pore capacity (100–500 Å in radius): | 0.243 cc/g. |
| Total pore capacity: | 0.585 cc/g. |
| Peak pore radius in distribution: | 50 Å, 250 Å |

EXAMPLE 14

Alumina+Titania

A mixture of boehmite (Pural SB manufactured by Condea Co. 75 g. of titanium dioxide (special grade manufactured by Junsei Kagaku K. K.) and 97.5 g. of carbon black F (30 wt.% based on total of boehmite and titania) was mixed in a dry form for 60 min. by a mixer and moved into a batch type kneader. The mixture was admixed with 233 g. of 3.1% nitric acid aqueous solution and the mixture was kneaded for 25 min. and then, 157 g. of 1.2% ammonia water was added and the mixture was kneaded for 25 min. and extruded to give a diameter of 1.5 mm by a screw type extruding machine. The extruded product was dried at 130° C. for 1 day and fired at 600° C. for 7 hours under air flow to obtain a product made of 71 wt.% of alumina and 29 wt.% of titania which had a surface area of 151 m²/g.

The pore capacity and the pore distribution of the product are as follows:

| | |
|---|---|
| Pore capacity (37.5–100 Å in radius): | 0.41 cc/g. |
| Pore capacity (100–500 Å in radius): | 0.408 cc/g. |
| Total pore capacity: | 0.841 cc/g. |
| Peak pore radius in distribution: | 71 Å, 360 Å |

REFERENCE 6

Alumina+Boria

In accordance with the process of Example 13 except that carbon black was not used, a product made of alumina and boria was produced. The product had a surface area of 204 m²/g.

The pore capacity and the pore distribution of the product are as follows:

| | |
|---|---|
| Pore capacity (37.5–100 Å in radius): | 0.121 cc/g. |
| Pore capacity (100–500 Å in radius): | 0.020 cc/g. |
| Total pore capacity: | 0.231 cc/g. |
| Peak pore radius in distribution: | 41 Å |

REFERENCE 7

Alumina+Titania

In accordance with the process of Example 14 except that carbon black was not used, a product made of alumina and titania was produced. The product had a surface area of 131 m²/g.

The pore capacity and the pore distribution of the product are as follows:

| | |
|---|---|
| Pore capacity (37.5–100 Å in radius): | 0.547 cc/g. |
| Pore capacity (100–500 Å in radius): | 0.081 cc/g. |
| Total pore capacity: | 0.639 cc/g. |
| Peak pore radius in distribution: | 70 Å |

EXAMPLE 15

Alumina+Zeolite

A mixture of 200 g. of boehmite (Pural SB manufactured by Condea Co.) (150 g. as $Al_2O_3$), 65 g. of molecular seive SK-41 ($NH_4$-Y) (manufactured by Linde Co.) and 50 g. of carbon black G (19 wt.% based on total of boehmite and zeolite) was mixed in a dry form for 60 min. by a mixer and was moved into a batch type kneader and was kneaded for 30 min. after adding 190 g. of 3.0% nitric acid aqueous solution and then, further kneaded for 30 min. after adding 85 g. of 1.8% ammonia water. The mixture was extruded to give a diameter of 1.5 mm by a screw type extruding machine. The extruded produce was dried at 130° C. for 1 day under air flow and fired at 600° C. for 10 hours to obtain a product made of 75 wt.% of alumina and 25 wt.% of HY form zeolite which had a surface area of 328 m²/g.

The pore capacity and the pore distribution of the product are as follows:

| | |
|---|---|
| Pore capacity (37.5–100 Å in radius): | 0.499 cc/g. |
| Pore capacity (100–500 Å in radius): | 0.320 cc/g. |
| Total pore capacity: | 0.834 cc/g. |
| Peak pore radius in distribution: | 70 Å, 210 Å |

The pore distribution curve of the product is shown in FIG. 8.

EXAMPLE 16

Alumina+Zeolite

A mixture of 700 g. of transition alumina having an average diameter of about 50µ (ω- and ρ-alumina analyzed by X-ray) 300 g. of molecular seive SK-41 ($NH_4$-Y) (manufactured by Linde Co.) and 300 g. of carbon black F (30 wt.% based on total of alumina and zeolite) was mixed in a dry form for 60 min. by a mixer. The mixture was treated by a tumbling granulating machine while spraying water to obtain spherical product having a diameter of 3–4 mm. The wet granular product was charged in a closed container and aged at room temperature for one week and then, kept at 150° C. for 2 hours to perform a steam curing. The granular product containing alumina hydrate was dried at 130° C. for 1 day and fired at 600° C. for 8 hours under air flow to obtain a product made of 75 wt.% of alumina and 25 wt.% of HY form zeolite, which had a surface area of 373 m²/g.

The pore capacity and the pore distribution of the produce are as follows:

| | |
|---|---|
| Pore capacity (37.5–100 Å in radius): | 0.069 cc/g. |
| Pore capacity (100–500 Å in radius): | 0.103 cc/g. |
| Total pore capacity: | 0.724 cc/g. |
| Peak pore radius in distribution: | 380 Å. 25000 Å |

EXAMPLE 17

Silica+Zeolite

A mixture of 180 g. of the dry powder of silica and carbon obtained in Example 9 (100 g. of $SiO_2$ and 30 g. of carbon black F) and 40 g. of molecular seive SK-41 ($NH_4Y$) (manufactured by Linda Co.) was mixed in a dry form for 60 min. by a mixer. The resulting mixture (21 wt.% of carbon based on total of $SiO_2$ and $NH_4Y$) was moved into a batch type kneader and kneaded for 80 min. while adding gradually 80 ml of 10% aqueous solution of polyvinyl alcohol (NM-14 manufactured by Nippon Gosei K. K.) and the mixture was extruded to give a diameter of 3 mm by a screw type extruding machine. The extruded product was dried at 130° C. for 1 day and fired at 600° C. for 7 hours under air flow to obtain a product made of 77 wt.% of silica and 23 wt.% of HY form zeolite which had a surface area of 218 m²/g.

The pore capacity and the pore distribution of the product are as follows:

| | |
|---|---|
| Pore capacity (37.5–100 Å in radius): | 0.316 cc/g. |
| Pore capacity (100–500 Å in radius): | 0.254 cc/g. |
| Total pore capacity: | 0.788 cc/g. |
| Peak pore radius in distribution: | 68 Å, 200 Å |

REFERENCE 8

Alumina+Zeolite

In accordance with the process of Example 15 except that carbon black was not used, a product made of alumina and HY-form zeolite was obtained. The product had a surface area of 337 m²/g.

The pore capacity and the pore distribution of the product are as follows:

| | |
|---|---|
| Pore capacity (37.5–100 Å in radius): | 0.577 cc/g. |
| Pore capacity (100–500 Å in radius): | 0.063 cc/g. |
| Total pore capacity: | 0.658 cc/g. |
| Peak pore radius in distribution: | 75 Å |

The pore distribution curve of the product is shown in FIG. 9.

EXAMPLE 18

Alumina+Kaoline

A mixture of 200 g. of boehmite (Pural SB manufactured by Condea) (150 g. as Al₂O₃), 65 g. of kaoline clay (ASP #200 manufactured by Tsuchiya Kaoline Kogyo K. K.), and 50 g. of carbon black G (19 wt.% of based on total of boehmite and Kaoline) was mixed in a dry form for 60 min. by a mixer and the mixture was moved into a batch type kneader and was kneaded for 20 min. after adding 210 g. of 2.7% nitric acid aqueous solution and then, further kneaded for 20 min. after adding 105 g. of 1.5% ammonia water. The mixture was extruded to give a diameter of 1.5 mm by a screw type extruding machine. The extruded product was dried at 130° C. for 1 day and fired at 600° C. for 5 hours under air flow to obtain a product made of 70 wt.% of alumina and 30 wt.% of kaoline which had a surface area of 170 m²/g.

The pore capacity and the pore distribution of the product are as follows:

| | |
|---|---|
| Pore capacity (37.5–100 Å in radius): | 0.490 cc/g. |
| Pore capacity (100–500 Å in radius): | 0.240 cc/g. |
| Total pore capacity: | 0.740 cc/g. |
| Peak pore radius in distribution: | 70 Å, 190 Å |

EXAMPLE 19

Alumina+Sepiolite

In accordance with the process of Example 18 except using sepiolite (manufactured by Takeda Yakuhin K. K.) instead of kaoline, the components were mixed, kneaded and fired to obtain a product made of 70 wt.% of alumina and 30 wt.% of sepiolite which had a surface area of 217 m²/g.

The pore capacity and the pore distribution of the product are as follows:

| | |
|---|---|
| Pore capacity (37.5–100 Å in radius): | 0.480 cc/g. |
| Pore capacity (100–500 Å in radius): | 0.322 cc/g. |
| Total pore capacity: | 0.821 cc/g. |
| Peak pore radius in distribution: | 67 Å, 195 Å |

REFERENCE 9

Alumina+Kaoline

In accordance with the process of Example 18 except that carbon black was not used, a product made of alumina and kaoline was produced. The product had a surface area of 152 m²/g.

The pore capacity and the pore distribution of the product are as follows:

| | |
|---|---|
| Pore capacity (37.5–100 Å in radius): | 0.566 cc/g. |
| Pore capacity (100–500 Å in radius): | 0.024 cc/g. |
| Total pore capacity: | 0.589 cc/g. |
| Peak pore radius in distribution: | 70 Å |

REFERENCE 10

Alumina+Sepiolite

In accordance with the process of Example 19 except that carbon black was not used, a product made of alumina and sepiolite was produced. The product had a surface area of 223 m²/g.

The pore capacity and the pore distribution of the product are as follows:

| | |
|---|---|
| Pore capacity (37.5–100 Å in radius): | 0.428 cc/g. |
| Pore capacity (100–500 Å in radius): | 0.113 cc/g. |
| Total pore capacity: | 0.557 cc/g. |
| Peak pore radius in distribution: | 66 Å |

EXAMPLES 20 to 22

A mixture of 255 g. of transition alumina of Example 7 and 67.5 g. of carbon black A was mixed for 60 min. by a mixer. In Example 22, 22.5 g. of crystalline cellulose (Abicell TG-101: manufactured by Asahi Kasei K.K.) was further incorporated. Each mixture was moved into a kneader and was kneaded after gradually adding 131 cc. of an aqueous solution containing 6.75 g. of polyethyleneglycol (PEG #200 manufactured by Nakai Kagaku Yakuhin K.K.) and then, each mixture was extruded to give a diameter of 1.5 mm by a screw extruding machine. The resulting extruded product was steam-cured as set forth in Example 7. In Example 20, the steam-curing was performed at 110° C. Each product was treated as set forth in Example 7 to obtain each alumina product having characteristics shown in Table 5.

TABLE 5

| Example | 20 | 21 | 22 |
|---|---|---|---|
| Crushing strength (kg/piece) | 2.5 | 2.8 | 2.7 |
| Specific surface area (m²/g) | 312 | 290 | 262 |

TABLE 5-continued

| Example | 20 | 21 | 22 |
|---|---|---|---|
| Pore capacity (cc/g.) (37.5–100 Å in radius) | 0.130 | 0.205 | 0.226 |
| Pore capacity (cc/g.) (100–500 Å in radius) | 0.365 | 0.405 | 0.404 |
| Total pore capacity (cc/g.) (37.5–75000 Å in radius) | 0.565 | 0.619 | 0.916 |
| Peak pore radius in distribution (Å) | 50 500 | 42 310 | 41 600 |

The pore distribution curve of the product is shown in FIG. 10.

EXAMPLE 23

A mixture of 200 g. of boehmite powder of Example 1 and 100 g. of carbon black A was mixed in a dry form by a mixer for 60 min. and the mixture was moved into a batch type kneader and was kneaded after adding 205 g. of 3.0% nitric acid aqueous solution for about 60 min. The mixture was extruded in a diameter of 1.5 mm by a screw type extruding machine. The extruded product was treated as set forth in Example 1 to obtain an alumina product.

The characteristics of the product are as follows:

| | |
|---|---|
| Crushing strength: | 3.6 kg/piece |
| Specific surface area: | 250 m²/g. |
| Pore capacity (37.5–100 Å in radius): | 0.424 cc/g. |
| Pore capacity (100–500 Å in radius): | 0.380 cc/g. |
| Total pore capacity: (37.5–75000 Å in radius) | 0.810 cc/g. |
| Peak pore radius in distribution: | 42 Å and 175 Å |

The pore distribution curve of the product is shown in FIG. 11.

We claim:

1. A process for producing a catalyst or catalyst carrier, which comprises:

shaping a mixture comprising at least one inorganic member selected from the group consisting of alumina hydrate and mixtures of alumina hydrate with other refractory inorganic oxide, and from about 20 to 80 wt.%, based on the total oxide content of said mixture, of carbon black, wherein said carbon black aids in the formation of controlled pores in the catalyst or catalyst carrier whereby a shaped product is obtained;

drying the shaped product without sintering; and firing the dried shaped product in an oxygen-containing gas flow, wherein the carbon black is burned off and a porous refractory inorganic oxide catalyst or catalyst carrier containing alumina is formed having a specific surface area ranging from 30 to 350 m²/g and a total pore capacity of pores between 37.5 Å and 75,000 Å in radius ranging from 0.6 to 1.5 cc/g wherein the pore capacity of pores between 37.5 Å and 500 Å in radius is 90% or more of the total pore capacity, said catalyst or catalyst carrier also having two peak pore distributions, one being between 40 Å and 100 Å in radius and the other being between 100 Å and 500 Å in radius with a pore capacity of pores between 37.5 Å and 100 Å in radius of 0.45 cc/g or more and a pore capacity of pores between 100 Å and 500 Å in radius of 0.1 cc/g or more.

2. The process according to claim 1, wherein the inorganic member is alumina hydrate and the porous refractory inorganic oxide catalyst or catalyst carrier formed consists essentially of alumina.

3. The process according to claim 2, wherein alumina hydrate is boehmite.

4. The process according to claim 2, wherein alumina hydrate is pseudoboehmite.

5. The process according to claim 2, wherein the alumina hydrate is boehmite and the porous refractory inorganic oxide catalyst or catalyst carrier formed consists essentially of active alumina.

6. The process according to claim 2, wherein the alumina hydrate is pseudoboehmite and the porous refractory inorganic oxide catalyst or catalyst carrier formed consists essentially of active alumina.

7. The process according to claim 2, wherein the alumina hydrate is boehmite and the porous refractory inorganic oxide catalyst or catalyst carrier formed consists essentially of $\gamma$- or $\theta$-alumina.

8. The process according to claim 2, wherein the alumina hydrate is pseudoboehmite and the porous refractory inorganic oxide catalyst or catalyst carrier formed consists essentially of $\gamma$- or $\theta$-alumina.

9. The process according to claim 1, wherein the other refractory inorganic oxide is one selected from the group consisting of silica, silica-alumina, zeolite, kaoline clay and sepiolite.

10. The process according to claim 1, wherein the inorganic member comprises boehmite and at least one member selected from the group consisting of silica, silica-alumina, zeolite, kaoline clay and sepiolite.

11. The process according to claim 1, wherein the inorganic member comprises pseudoboehmite and at least one member selected from the group consisting of silica, silica-alumina, zeolite, kaoline clay and sepiolite.

12. The process according to claim 1, wherein carbon black having an average diameter ranging from 150 to 3000 Å is incorporated in the mixture.

13. The process according to claim 1, wherein an acid is added to the mixture of the inorganic member and carbon black.

* * * * *

UNITED STATES PATENT AND TRADEMARK OFFICE
CERTIFICATE OF CORRECTION

PATENT NO. : 4,508,841

DATED : April 2, 1985

INVENTOR(S) : Kazuhiko Onuma, et al.

It is certified that error appears in the above-identified patent and that said Letters Patent is hereby corrected as shown below:

On the title page;

PRIORITY INFORMATION IS INCORRECT:

Japanese Patent Application Nos: 
| | |
|---|---|
| 6147/1981 | 01/19/1981 |
| 17759/1981 | 02/09/1981 |
| 29699/1981 | 03/02/1981 |
| 52730/1981 | 04/08/1981 |
| 198014/1981 | 12/09/1981 |

Signed and Sealed this

Thirtieth Day of July 1985

[SEAL]

Attest:

DONALD J. QUIGG

Attesting Officer     Acting Commissioner of Patents and Trademarks